United States Patent
Jeung et al.

(10) Patent No.: US 11,479,382 B2
(45) Date of Patent: Oct. 25, 2022

(54) BATTERY LABEL ALIGNMENT DEVICE AND METHOD

(71) Applicant: LG CHEM, LTD., Seoul (KR)

(72) Inventors: Seok Won Jeung, Pyeongtaek-Si (KR); Ju Hwan Baek, Cheongju-Si (KR); Geon Tae Park, Cheongju-Si (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/639,431

(22) PCT Filed: Aug. 10, 2018

(86) PCT No.: PCT/KR2018/009211
§ 371 (c)(1),
(2) Date: Feb. 14, 2020

(87) PCT Pub. No.: WO2019/035608
PCT Pub. Date: Feb. 21, 2019

(65) Prior Publication Data
US 2021/0130029 A1    May 6, 2021

(30) Foreign Application Priority Data
Aug. 17, 2017  (KR) .................. 10-2017-0104257

(51) Int. Cl.
*B65C 9/42* (2006.01)
*B65C 9/00* (2006.01)
(Continued)

(52) U.S. Cl.
CPC .............. *B65C 9/42* (2013.01); *B65C 9/0015* (2013.01); *B65C 9/04* (2013.01); *B65C 9/06* (2013.01);
(Continued)

(58) Field of Classification Search
CPC .............. B65C 9/42; B65C 2009/0053; B65C 2009/404
See application file for complete search history.

(56) References Cited

U.S. PATENT DOCUMENTS 6,080,250 A    6/2000  Urban et al.
9,731,856 B1   8/2017  Houlihan et al.
(Continued)

FOREIGN PATENT DOCUMENTS

CN    203946330 U    11/2014
CN    205486132 U    8/2016
(Continued)

OTHER PUBLICATIONS

International Search Report (PCT/ISA/210) issued in PCT/KR2018/009211, dated Nov. 19, 2018.
(Continued)

*Primary Examiner* — Philip C Tucker
*Assistant Examiner* — John Blades
(74) *Attorney, Agent, or Firm* — Birch, Stewart, Kolasch & Birch, LLP

(57) ABSTRACT

A battery label attachment apparatus for attaching a label to a battery including a label support on which the label is placed, an alignment check part configured to check whether an alignment state of the label is normal or defective, and a label aligning part configured to align the label when the alignment state determined by the alignment check part is defective is provided. A method for attaching a label to a battery is also provided.

4 Claims, 2 Drawing Sheets

(a)

(b)

(51) Int. Cl.
    *B65C 9/04*         (2006.01)
    *B65C 9/06*         (2006.01)
    *B65C 9/40*         (2006.01)

(52) U.S. Cl.
    CPC ............... *B65C 2009/0053* (2013.01); *B65C 2009/0059* (2013.01); *B65C 2009/404* (2013.01)

(56) References Cited

U.S. PATENT DOCUMENTS

| | | | |
|---|---|---|---|
| 2012/0193022 A1* | 8/2012 | Yamasita | B65C 9/42 156/249 |
| 2014/0347473 A1 | 11/2014 | Wolff et al. | |

FOREIGN PATENT DOCUMENTS

| | | | |
|---|---|---|---|
| EP | 2481675 A2 | 8/2012 | |
| EP | 3031736 A1 | 6/2016 | |
| JP | 2002-362524 | * 12/2002 | ............... B65C 9/42 |
| JP | 2002-362524 A | 12/2002 | |
| JP | 2006-44778 A | 2/2006 | |
| JP | 4132251 B2 | 8/2008 | |
| JP | 2010-208683 A | 9/2010 | |
| JP | 2012-171623 A | 9/2012 | |
| JP | 5993044 B2 | 9/2016 | |
| KR | 10-1995-0023570 A | 8/1995 | |
| KR | 10-1999-0071850 A | 9/1999 | |
| KR | 10-0352994 B1 | 9/2002 | |
| KR | 2003-0088755 A | 11/2003 | |
| KR | 20-0403602 Y1 | 12/2005 | |
| KR | 10-1136209 B1 | 4/2012 | |
| KR | 10-1481450 B1 | 1/2015 | |
| KR | 10-2015-0034149 A | 4/2015 | |
| KR | 10-2015-0041521 A | 4/2015 | |

OTHER PUBLICATIONS

Extended European Search Report for European Application No. 18845681.8, dated Sep. 11, 2020.

* cited by examiner

[Fig1]
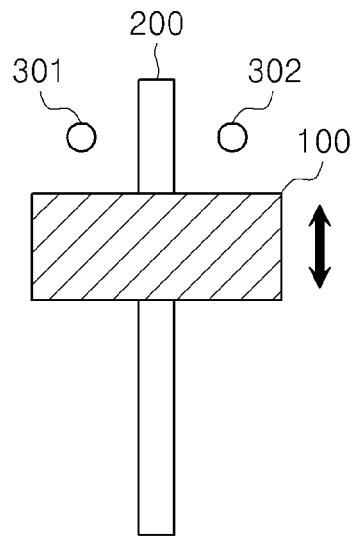
[Fig2]
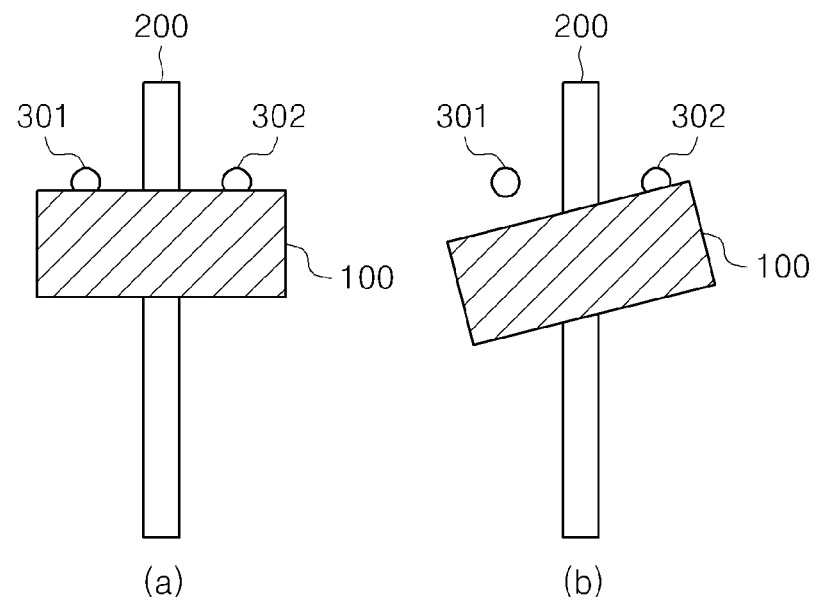
(a)  (b)

[Fig3]
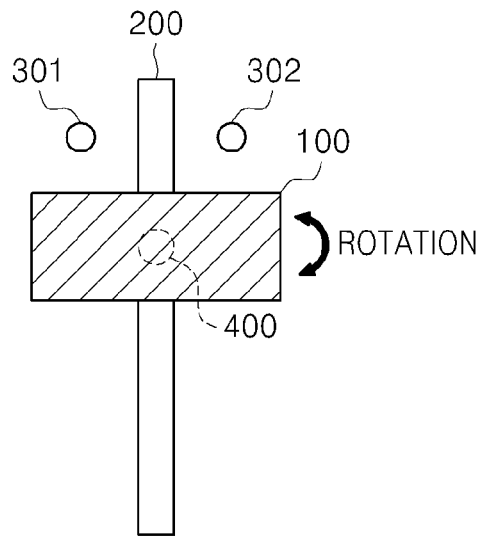
[Fig4]
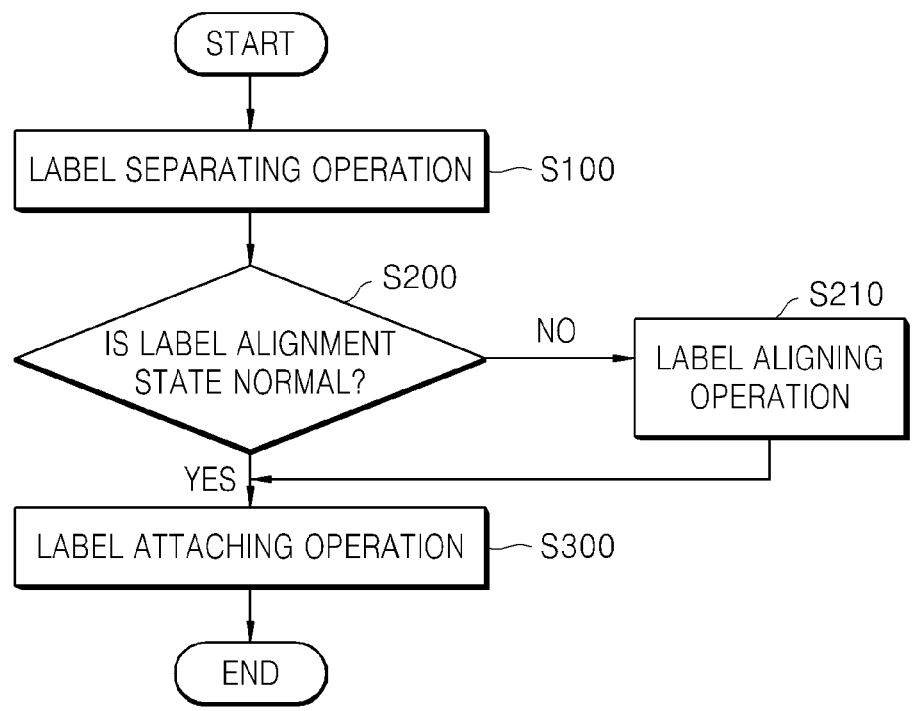

BATTERY LABEL ALIGNMENT DEVICE AND METHOD

TECHNICAL FIELD

The present invention relates to an apparatus and a method for aligning labels attached to a battery.

More particularly, the present invention relates to an apparatus and a method for aligning labels attached to a battery using a sensor.

BACKGROUND ART

Recently, rechargeable secondary batteries have been widely used as energy sources for wireless mobile apparatuses. In addition, the secondary batteries are in the spotlight as energy sources for electrical vehicles, hybrid electric vehicles, etc., which are proposed as alternatives for solving air pollution or the like of existing gas vehicles, diesel vehicles, etc., which use fossil fuels. Thus, the kinds of applications using the secondary battery are much diversified due to the merits of the secondary battery, and in future, the secondary battery will be expected to be applied to more fields and products than now.

Such secondary batteries may also be classified, according to the configurations of electrodes and electrolytes, into lithium ion batteries, lithium ion polymer batteries, lithium polymer batteries, or the like, and among these, use of the lithium ion polymer batteries which have low possibility of leaking electrolytes and are easily manufactured is being increased.

In general, the secondary batteries are classified, according to the shapes of cell cases, into cylindrical and prismatic batteries in each of which an electrode assembly is embedded in a cylindrical or prismatic metal can and a pouch-type cells in each of which an electrode assembly is embedded in a pouch-type case formed of an aluminum laminate sheet.

It can be said that the best merit of a mobile device such as a laptop PC is convenient portability, and the secondary battery serves the largest role for enabling the portability.

The secondary batteries have been used as energy sources for various electronic products as well as various mobile apparatuses, but various combustible materials are embedded in the secondary batteries. Therefore, there is a danger of heating, explosion, or the like due to overcharge, over-current, other physical external shocks, or the like, and to solve this, positive temperature coefficient (PTC) elements, protection circuit modules (PCMs), or the like are mounted in a state of being connected to a battery cell as safety elements which can effectively control abnormal states such as overcharge and over-current.

A battery pack equipped with the components such as the safety elements and PCM modules on a battery case is manufactured through a plurality of complicated processes for accommodating an electrode assembly in a battery case, injecting and sealing an electrolyte, and a label indicating the specifications of the battery pack is attached to the outer portion of the case.

Conventionally, when a label sheet was manually attached to the exterior case of a secondary battery, or a label attaching device was used for attaching a label sheet, the alignment state was checked by using a block, and when the alignment of the label was defective, the label was re-aligned by pushing the label with a physical block.

As such, when the label was re-aligned by being pushed with the physical block, there was a problem in that in case of a peeling label, the label was not re-aligned, but pushed to be wrinkled or overlapped.

DISCLOSURE OF THE INVENTION

Technical Problem

The present invention provides an apparatus and a method for realigning a label without applying a physical force directly on the label to be attached to a battery case.

Technical Solution

In accordance with an embodiment of the present invention, an apparatus for attaching a label to a battery includes: a label support on which the label is placed; an alignment check part configured to check whether an alignment state of the label is normal or defective; and a label aligning part configured to align the label when the alignment state determined by the alignment check part is defective.

The alignment check part may include: a servo robot configured to move the label support, on which the label is placed, to a corresponding position of the battery, the label being attachable to the battery at the corresponding position of the battery; two sensors configured to detect the alignment state of the label; and an alignment determining part configured to determine, according to a combination of signals detected by the two sensors, whether the alignment state is normal or defective.

The two sensors may include: a first sensor disposed to be spaced apart by a preset distance to the left with respect to the servo robot; and a second sensor disposed to be spaced apart a preset distance to the right with respect to the servo robot, wherein the first sensor and the second sensor may be disposed side by side on a straight line perpendicular to a moving direction of the servo robot.

The servo robot may move the label support and position the label at an alignment determination position, and when the label is at the alignment determination position, the alignment determination part may determine the alignment state is defective when only the first sensor or the second sensor detects the label and that the alignment state is normal when both of the first and second sensors detect the label.

The label alignment part may include: a rotation part configured to rotate the label support clockwise or counter-clockwise; and a rotation control part configured to control a rotation direction and a rotation angle of the rotation part.

When the alignment determination part determines that the alignment state is normal, the rotation control part may transmit a current state holding signal, and when the alignment determination part determines that the alignment state is defective, the rotation control part may transmit a signal for rotating the rotation part counterclockwise by a predetermined angle when only the first sensor detects the label, and may transmit a signal for rotating the rotation part clockwise by a predetermined angle when only the second sensor detects the label.

In accordance with an embodiment of the present invention, a method for attaching a label to a battery includes: a label separating operation for separating a protective paper and a label and placing the label on a label support; and a label alignment state check operation for checking an alignment state of the label separated in the label separating operation, wherein when a normal alignment state is determined in the label alignment state check operation, a label attaching operation for attaching the label to the battery may be performed, and when a defective alignment state is determined in the label alignment state check operation, a label aligning operation for aligning the label may be performed and then the label attaching operation may be performed.

In the label alignment state check operation, the alignment state may be checked by using a first sensor disposed to be spaced a preset distance to the left with respect to a servo robot configured to move a label support, and a second sensor disposed to be spaced apart a preset distance to the right with respect to the servo robot configured to move the label support, when the label is detected by only the first sensor or the second sensor, the alignment state may be determined to be defective, and when the label is detected by both the first and second sensors, the alignment state may be determined to be normal.

In the label alignment operation, when the alignment state is determined to be normal in the label alignment state check operation, a current state may be maintained, when the alignment state is determined to be defective in the label alignment state check operation, and the label is detected only by the first sensor, a rotation part configured to rotate the label support may be rotated counterclockwise by a predetermined angle to align the label, and when the alignment state is determined to be defective in the label alignment state check operation, and the label is detected only by the second sensor, the rotation part may be rotated clockwise by a predetermined angle to align the label.

Advantageous Effects

According to the present invention, a label is realigned without applying a physical force to the label, whereby a phenomenon in which wrinkles occur in the label or the label is pushed can be prevented.

BRIEF DESCRIPTION OF THE DRAWINGS

FIG. 1 is a total configuration diagram in accordance with an embodiment of the present invention.

FIG. 2 is a schematic view of two different orientations for a label in which (a) is a view when label alignment is normal in accordance with an embodiment of the present invention, and (b) is a view when label alignment is defective in accordance with an embodiment of the present invention.

FIG. 3 is a view illustrating rotation of a label in accordance with an embodiment of the present invention.

FIG. 4 is a flowchart of a label alignment method in accordance with an embodiment of the present invention.

MODE FOR CARRYING OUT THE INVENTION

Hereinafter, embodiments of the present disclosure will be described in detail with reference to the accompanying drawings so that the present disclosure may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and like reference numerals in the drawings denote like elements.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present disclosure. The terms of a singular form may include plural forms unless referred to the contrary.

In this disclosure below, when one part (or element, device, etc.) is referred to as being 'connected' to another part (or element, device, etc.), it should be understood that the former can be 'directly connected' to the latter, or 'electrically connected to the latter via an intervening part (or element, device, etc.). Furthermore, when it is described that one part "includes" some components, it does not mean that other components are excluded but means that other elements may be further included if there is no specific contrary indication. The terms "step of (performing)" or "step of (doing)" used in the entire specification of the present disclosure does not mean "step for".

Terms used in the present invention is selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple names of the terms.

1. Battery Label Attaching Apparatus in Accordance with an Embodiment of the Present Invention FIGS. 1 to 3 are configuration diagrams of a battery label attachment apparatus in accordance with an embodiment of the present invention.

Hereinafter with reference to FIGS. 1 to 3, a battery label attachment apparatus in accordance with an embodiment of the present invention will be described.

In accordance with an embodiment of the present invention, a battery label attachment apparatus may include: a label support (not shown) on which a label 100 is placed; alignment check parts 301 and 302 configured to check whether the alignment of the label is normal; and a label aligning part configured to align the label when an abnormality is checked from the alignment check parts 301 and 302.

Specifically, the alignment check parts 301 and 302 may include: a servo robot 200 configured to move the label support, on which the label 100 is placed, to a corresponding position of the battery, the label being attached to the position; two sensors 301 and 302 configured to sense the position of the label 100; and an alignment determining part (not shown) configured to determine, according to a combination of signals detected by the two sensors, whether alignment is normal or defective. The alignment determining part is a processor configured to receive the signals from the two sensors 301 and 302.

Meanwhile, the servo robot 200 is located at the center of the label 100 and may move the label support in a direction perpendicular to the total length of the label.

Meanwhile, the two sensors 301 and 302 for detecting the position of the label 100 may include: a first sensor 301 disposed to be spaced apart a preset distance to the left with respect to the servo robot 200; and a second sensor 302 disposed to be spaced apart a preset distance to the right with respect to the servo robot 200.

At this point, the first sensor 301 and the second sensor 302 may be disposed side by side on a straight line perpendicular to the moving direction of the servo robot 200.

Such disposition may vary according to the shape, size, and characteristic of the label 100.

Meanwhile, the first sensor 301 and the second sensor 302 may be symmetrical to each other with respect to the servo robot 200.

In addition, the preset distance between the first sensor 301 and the servo robot 200 and the preset distance between the second sensor 302 and the servo robot 200 may be set according to an allowable error range in aligning the label 100.

For example, when the distance between the first sensor 301 and the servo robot 200 and the distance between the second sensor 302 and the servo robot 200 are far from each other, even a slight misalignment of the label 100 may cause label alignment to be defective. In comparison, when the distance between the first sensor 301 and the servo robot 200 and the distance between the second sensor 302 and the servo robot 200 are close to each other, defective label alignment may be detected only when the label 100 is further misaligned than when the distance between the first sensor 301 and the servo robot 200 and the distance between the second sensor 302 and the servo robot 200 is far from each other.

Meanwhile, the servo robot 200 may move the label support and locate the label at an alignment determination position.

Meanwhile, the alignment determination position may be a position at which the label 100 can be detected simultaneously by the first sensor 301 and the second sensor 302 while the label is normally aligned.

Meanwhile, the alignment determination part (not shown) may determine an alignment defect when the label 100 is detected only by either the first sensor 301 or the second sensor 302, and when the label 100 is detected by both two sensors 301 and 302, the alignment determination part may determine normal alignment.

Meanwhile, the label alignment part may include: a rotation part 400 configured to rotate the label support clockwise or counterclockwise; and a rotation control part configured to control a rotation direction and a rotation angle of the rotation part. The rotation control part is a processor.

More specifically, the rotation control part 400 does not transmit a separate rotation command to the rotation part when the alignment determination part determines a normal alignment state, but may transmit a rotation command to the rotation part when the alignment determination part determines a defective alignment state.

More specifically, the rotation control unit may transmit to the rotation part 400 a signal of a command to rotate the rotation part 400 counterclockwise by a predetermined angle when the label is detected only by the first sensor, and transmit a signal of a command to rotate the rotation alignment determination part determines a normal alignment state, but may transmit to the rotation part 400 a signal of a command to rotate the rotation part 400 clockwise by a predetermined angle when the label is detected only by the second sensor.

Meanwhile, the predetermined angle by which the rotation part 400 rotates may be an angle set in advance or may be set different according to the amount of light detected by the first sensor or the second sensor when the first sensor or the second sensor can detect the amount of light.

For example, when much amount of light is detected, the rotation part may be rotated by a small angle, and when less amount of light is detected, the rotation part may be rotated by a large angle.

Meanwhile, as such, when the label alignment is completed, the completely aligned label can be attached by pressing the label to a battery pack.

2. Battery Label Attaching Method in Accordance with an Embodiment of the Present Invention FIG. 4 is a flowchart illustrating a sequence of a battery label attachment method in accordance with an embodiment of the present invention.

Hereinafter with reference to FIG. 4, a battery label attachment method in accordance with an embodiment of the present invention will be described.

In accordance with an embodiment of the present invention, a method for attaching a label to a battery includes: a label separating operation (S100) for separating a protective paper and the label and placing the label on a label support; and a label alignment state check operation (S200) for checking an alignment state of the label separated in the label separating operation, wherein a label attaching operation (S300) for attaching the label to the battery may be performed when a normal alignment state is checked in the label alignment check operation (S200), and when a defective alignment state is checked in the label alignment state check operation (S200), a label aligning operation (S210) for aligning the label may be performed and then the label attaching operation (S300) may be performed.

More specifically, the label alignment state check operation (S200) may be a operation in which an alignment state is checked by using a first sensor disposed to be spaced apart a preset distance to the left with respect to a servo robot that moves the label support and a second sensor disposed to be spaced apart a preset distance to the right with respect to the servo robot that moves the label support.

More specifically, in the label alignment state check operation (S200), when the label is detected by either the first or second sensor, label alignment may be determined to be defective, and when the label is detected by both of the first and second sensors, the label alignment may be determined to be normal.

Meanwhile, the label aligning operation (S210) may not be performed when the label alignment is determined to be normal in the label alignment state check operation (S200).

Meanwhile, the label aligning operation (S210) may be performed when the label alignment is determined to be defective in the label alignment state check operation (S200).

More specifically, in the label aligning operation (S210), when the label is detected only by the first sensor, the rotation part is rotated counterclockwise by a predetermined angle to align the label, and when the label is detected only by the second sensor, the rotation part is rotated clockwise by a predetermined angle to align the label.

Meanwhile, the predetermined rotation angle may be an angle set in advance or may be set different according to the amount of light detected by the first sensor or the second sensor when the first sensor or the second sensor can detect the amount of light.

For example, when much amount of light is detected, the rotation part may be rotated by a small angle, and when less amount of light is detected, the rotation part may be rotated by a large angle.

Meanwhile, the technical idea of the present invention has been specifically described with respect to the above embodiments, but it should be noted that the foregoing embodiments are provided only for illustration while not limiting the present disclosure. In addition, various embodiments may be provided to allow those skilled in the art to understand the scope of the preset invention.

What is claimed is:

1. A battery label attachment apparatus for attaching a label to a battery, comprising:
  a servo robot on which the label is placed, the servo robot configured to move the label to a corresponding position of the battery, the label being attachable to the battery at the corresponding position of the battery;
  an alignment check part configured to check whether an alignment state of the label is normal or defective, the alignment check part including:
    a first sensor disposed to be spaced apart by a preset distance to the left with respect to the servo robot;
    a second sensor disposed to be spaced apart a preset distance to the right with respect to the servo robot, the first sensor and the second sensor are disposed side by side on a straight line perpendicular to a moving direction of the servo robot; and
    an alignment determining part configured to determine, according to a combination of signals detected by the first and second sensors, whether the alignment state is normal or defective; and
  a label aligning part configured to align the label when the alignment state determined by the alignment check part is defective,
  wherein the servo robot is displaceable relative to the first and second sensors, and
  wherein the servo robot, the first sensor, and the second sensor are disposed below the label.

2. The battery label attachment apparatus of claim 1, wherein
  the servo robot positions the label at an alignment determination position, and
  when the label is at the alignment determination position, the alignment determining part determines that the alignment state is defective when only the first sensor or the second sensor detects the label and that the alignment state is normal when both of the first and second sensors detect the label.

3. The battery label attachment apparatus of claim 1 wherein the label aligning part comprises:
  a rotator configured to rotate the label clockwise or counterclockwise; and
  a rotation control part configured to control a rotation direction and a rotation angle of the rotator.

4. The battery label attachment apparatus of claim 3, wherein
  when the alignment determining part determines that the alignment state is normal, the rotation control part transmits a current state holding signal, and
  when the alignment determining part determines that the alignment state is defective,
  the rotation control part transmits a signal for rotating the rotator counterclockwise by a predetermined angle when only the first sensor detects the label, and
  transmits a signal for rotating the rotator clockwise by a predetermined angle when only the second sensor detects the label.

* * * * *